(12) United States Patent
Joshi et al.

(10) Patent No.: US 7,200,277 B2
(45) Date of Patent: Apr. 3, 2007

(54) METHOD FOR TRANSCODING A JPEG2000 COMPRESSED IMAGE

(75) Inventors: Rajan L. Joshi, Pittsford, NY (US); Majid Rabbani, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 655 days.

(21) Appl. No.: 10/611,026

(22) Filed: Jul. 1, 2003

(65) Prior Publication Data
US 2005/0002573 A1  Jan. 6, 2005

(51) Int. Cl.
G06K 9/36 (2006.01)
G06K 9/46 (2006.01)
H04B 1/66 (2006.01)
H04N 7/12 (2006.01)
H04N 11/02 (2006.01)
H04N 11/04 (2006.01)

(52) U.S. Cl. .................. 382/248; 382/240; 375/240.19
(58) Field of Classification Search ................ 382/166, 382/232, 239, 240, 248; 375/240.18, 240.19
See application file for complete search history.

(56) References Cited

U.S. PATENT DOCUMENTS

| 7,110,608 B2* | 9/2006 | Chan et al. ............... 382/239 |
| 2003/0018818 A1* | 1/2003 | Boliek et al. ............ 709/247 |
| 2003/0113027 A1 | 6/2003 | Chan et al. |
| 2003/0228061 A1* | 12/2003 | Sakuyama ................ 382/233 |
| 2004/0175047 A1* | 9/2004 | Gormish et al. .......... 382/232 |

FOREIGN PATENT DOCUMENTS

EP  1 274 247 A2  1/2003

OTHER PUBLICATIONS

Tzannes, "An Iterative Rate Control Technique for Motion JPEG2000," Proc. SPIE, vol. 4790, 2002, pp. 220-227.*
Assuncao, "Transcoding of Single-Layer MPEG Video into Lower Rates," IEE Proc. Vision, Image and Signal Processing, vol. 144, Iss. 6, Dec. 1997, pp. 377-383.*
Taubman D: "High Performance Scalable Image Compression With EBCOT" IEEE Transactions on Image Processing, IEEE Inc. New York USA, vol. 9, No. 7, Jul. 2000, pp. 1158-1170, XP000951990 ISSN: 1057-7149, *p. 1158-p. 1166, paragraph I-IV*.
Wu, G.K. et al. "New Compression Paradigms in JPEG 2000", Proceedings of the SPIE, SPIE, Bellingham, VA., USA, vol. 4115, Jul. 31, 2000 pp. 418-429, XP008013391 ISSN: 0277-786X.
Taubman, D. "JPEG 2000 Verification Model VM3A, ISO/IEC JTC1/SC29/WG1 N1143", Feb. 1, 1999, pp. 1-90, XP002146099.

(Continued)

Primary Examiner—Jingge Wu
Assistant Examiner—Yubin Hung
(74) Attorney, Agent, or Firm—David M. Woods (57) ABSTRACT

A JPEG2000 compressed image is transcoded to a lower bit-rate or lower resolution, or both, without having to decompress the initial JPEG2000 image and then recompress it to a lower bit-rate and/or resolution. Instead, arithmetic decoding is performed only to the nearest higher bit-rate layer, up to the desired resolution, before performing rate-distortion optimization to produce the transcoded image.

2 Claims, 6 Drawing Sheets

OTHER PUBLICATIONS

"Information Technology-JPEG 2000 Image Coding System-Part 1: Core Coding System Technologies de l'Information-Systeme de Codage d'image JPEG 2000—Partie 1: Systeme de Codage de Noyau" International Standard ISO/IEC, vol. 15444-1, Dec. 15, 2000, pp. I-XII,1, XP008033454 pp. 57-78, Annex B.

U.S. Appl. No. 10/108,151, filed Mar. 27, 2002, Rajan L. Joshi et al.

"High performance scalable compression with EBCOT" by David Taubman. IEEE Transactions on Image Processing, 9(7), pp. 1158-1170, Jul. 2000.

"Kakadu software" developed by David Taubman (http://www.kakadusoftware.com).

* cited by examiner

|  | LAYER 0 | LAYER 1 | LAYER 2 |
|---|---|---|---|
| RESOLUTION 0 | 2154 | 3217 | 3749 |
| RESOLUTION 1 | 4258 | 8343 | 10594 |
| RESOLUTION 2 | 7106 | 19036 | 29425 |
| RESOLUTION 3 | 7952 | 32490 | 65135 |

METHOD FOR TRANSCODING A JPEG2000 COMPRESSED IMAGE

FIELD OF INVENTION

This invention pertains to the field of image compression, and in particular to the transcoding of a JPEG2000 compressed image.

BACKGROUND OF THE INVENTION

In December 2000, the International Standards Organization (ISO) ratified a new image compression standard known as the JPEG2000 image compression standard, as described in "Information Technology—JPEG2000 Image Coding System, ISO/IEC International Standard 15444-1, ITU Recommendation T.800". The JPEG2000 standard is based on the EBCOT algorithm as described by Taubman (David Taubman, "High performance scalable compression with EBCOT," *IEEE Transactions on Image Processing*, 9(7), pp. 1158–1170, July 2000). The JPEG2000 standard represents a paradigm shift from the old JPEG standard. With the explosion of devices such as PDAs and cellphones, it is anticipated that a high-resolution JPEG2000 compressed image stored at an image server may be accessed by a variety of clients with differing needs for resolution and image quality. One of the key properties of the JPEG2000 standard is that it is possible to parse a JPEG2000 bit-stream to extract a lower resolution and/or quality image without having to perform dequantization and requantization. In some cases, even arithmetic decoding may not be required.

Transcoding refers to converting a JPEG2000 compressed image to another JPEG2000 compressed image, typically at a lower bit-rate and/or resolution. Currently, the commercially available "Kakadu software", developed by David Taubman (http://www.kakadusoftware.com), provides rudimentary transcoding capability. The JPEG2000 bit-stream can be configured to have multiple quality layers, where each additional layer improves the quality of the compressed image. The performance of the transcoder in Kakadu is very poor if it is used to transcode an existing JPEG2000 bit-stream to a rate that is very far from the nearest bit-rate layer boundary. In co-pending, commonly-assigned U.S. patent application Ser. No. 10/108,151, entitled "Producing and Encoding Rate-distortion Information Allowing Optimal Transcoding of Compressed Digital Image" and filed Mar. 3, 2002, Joshi and Deever proposed a method to perform optimal transcoding, but their method requires that the JPEG2000 encoder that generated the initial JPEG2000 compressed image also stored rate-distortion information to facilitate transcoding.

In practice, it may be necessary to transcode a JPEG2000 compressed image for which no rate-distortion information has been stored. In such cases, it is desirable that the quality of the image transcoded to a lower bit-rate be as close as possible to a JPEG2000 image compressed directly to the lower bit-rate.

SUMMARY OF THE INVENTION

Accordingly, it is an object of the present invention to provide a method to transcode a JPEG2000 compressed bit-stream to a lower bit-rate or lower resolution or both.

The present invention is directed to overcoming one or more of the problems set forth above. Briefly summarized, according to one aspect of the present invention, the invention resides in a method for transcoding a JPEG2000 compressed image comprised of a collection of sub-bands encoded in one or more coding passes into a compressed bit-stream of quantized sub-band coefficients partitioned into codeblocks of each sub-band and aggregated into layers. More specifically, the method comprises the steps of:

(a) parsing a JPEG2000 compressed image to extract header information and packets;

(b) calculating the number of bytes associated with each layer at a user-specified desired resolution to produce a layer byte-count table;

(c) estimating the number of layers of the JPEG2000 compressed image that should be decoded up to the user-specified desired resolution for transcoding to a user specified desired bit-rate;

(d) extracting packets belonging to resolutions up to the user-specified desired resolutions from the layers to be decoded as determined in step (c), and extracting compressed data corresponding to each codeblock that contributed to the packets;

(e) concatenating the compressed data corresponding to each codeblock, extracted in step (d), to produce a compressed codeblock bit-stream for each codeblock;

(f) arithmetically decoding the compressed codeblock bit-stream corresponding to each codeblock to produce a quantizer index for each subband coefficient and a coding pass length table, which contains an estimate of the length of the compressed data corresponding to each decoded coding pass;

(g) producing an operational rate-distortion table for each codeblock from the quantizer indices and the coding pass length table produced in step (f);

(h) producing coding pass inclusion information, which represents the coding passes that should be included in the transcoded bit-stream, using the operational rate-distortion table produced in step (g), the desired bit-rate and a plurality of user-specified visual weights; and (i) producing a transcoded JPEG2000 bit-stream from the compressed codeblock bit-streams produced in step (e), the header information extracted in step (a) and the coding pass inclusion information produced in step (h).

In another aspect of the invention, a rate-control function is provided that uses the desired bit-rate from step (c) and the coding pass length tables produced in step (f) to produce coding pass inclusion information, which represents the coding passes that should be included in the transcoded bit-stream, for each codeblock. Then, a transcoded JPEG2000 bit-stream is produced from the compressed codeblock bit-streams produced in step (e), header information extracted in step (a) and the coding pass inclusion information produced above. According to this aspect of the invention, the decision whether to include a coding pass in the transcoded bit-stream is independent of distortion, and therefore it is unnecessary to produce an operational rate-distortion table.

The present invention provides a method for transcoding a JPEG2000 compressed image to a lower bit-rate or lower resolution or both. The advantage of this method is that it is not necessary to decompress the initial JPEG2000 image and then recompress it to a lower bit-rate and/or resolution. It is necessary to perform arithmetic decoding only to the nearest higher bit-rate layer, up to the desired resolution, before performing rate-distortion optimization to produce a transcoded image.

Another advantage of the present invention is that the quality of the transcoded image is very close to the quality of the image obtained by direct JPEG200 compression to the lower bit-rate and/or resolution.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The present invention relates to the compression of a digital image. Although there are other techniques well known in the art, the present invention will be described with respect to the technique set forth in the JPEG2000 image compression standard. The present description will be directed in particular to attributes forming part of, or cooperating more directly with, the algorithm in accordance with the present invention. Attributes not specifically shown or described herein may be selected from those described in "Information Technology—JPEG2000 Image Coding System, ISO/IEC International Standard 15444-1, ITU Recommendation T.800", or otherwise known in the art. In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
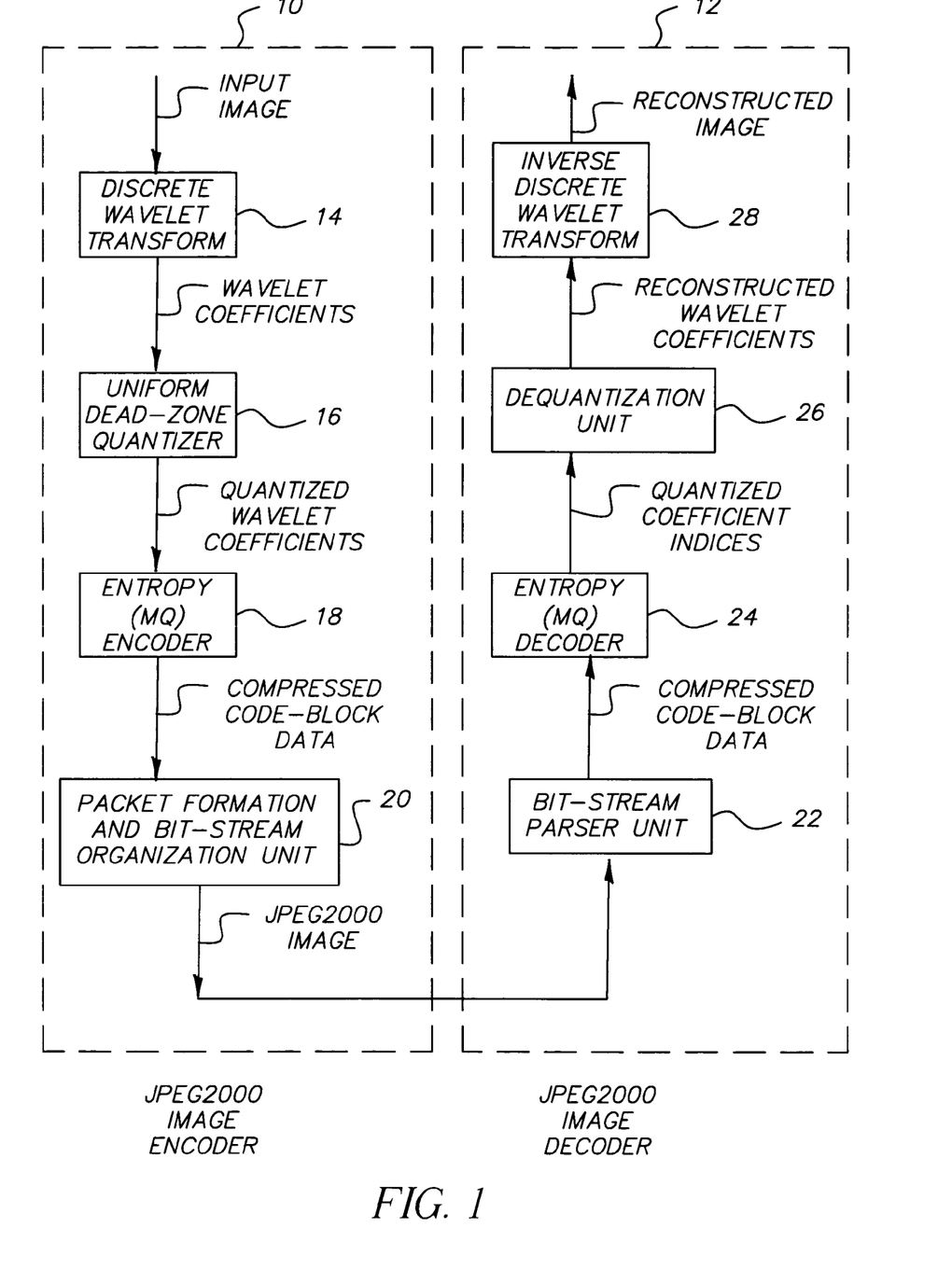
FIG. 1 shows a simplified block diagram of a JPEG2000 encoder and decoder.

A short summary of the JPEG2000 compression algorithm and syntax of a JPEG2000 compressed bit-stream will now be presented. A more detailed description can be found in the aforementioned ISO/IEC International Standard 15444-1. FIG. 1 shows a simplified block diagram of a JPEG2000 encoder (10) and decoder (12). In a JPEG2000 encoder, the discrete wavelet transform (DWT) unit (14) decomposes the input image into subbands. JPEG2000 also allows tiling of the image into a number of rectangular tiles. If tiling is used, the DWT is applied independently to each image tile. The resulting subband or wavelet coefficients undergo quantization with a uniform dead-zone quantizer (16). The quantized coefficients are grouped into precincts and codeblocks. Each codeblock is encoded independently by an entropy coder (18) to produce a compressed bit-stream corresponding to that codeblock. The packet formation and bit-stream organization unit (20) divides the compressed codeblock bit-stream into layers and aggregates the appropriate layer from different codeblocks into packets. It also decides the order in which the packets should appear in the compressed bit-stream. At the JPEG2000 decoder (12), the bit-stream parser unit (22) reads the header information and extracts the packets. It also decodes the packet headers and concatenates all the compressed data corresponding to each codeblock. The entropy decoder (24) decodes the compressed data to obtain quantizer indices corresponding to each wavelet coefficient. The dequantization unit (26) reconstructs wavelet coefficients from the respective quantizer indices. The reconstructed wavelet coefficients undergo inverse DWT in the inverse DWT unit (28) to produce the reconstructed image.

Figure 2:
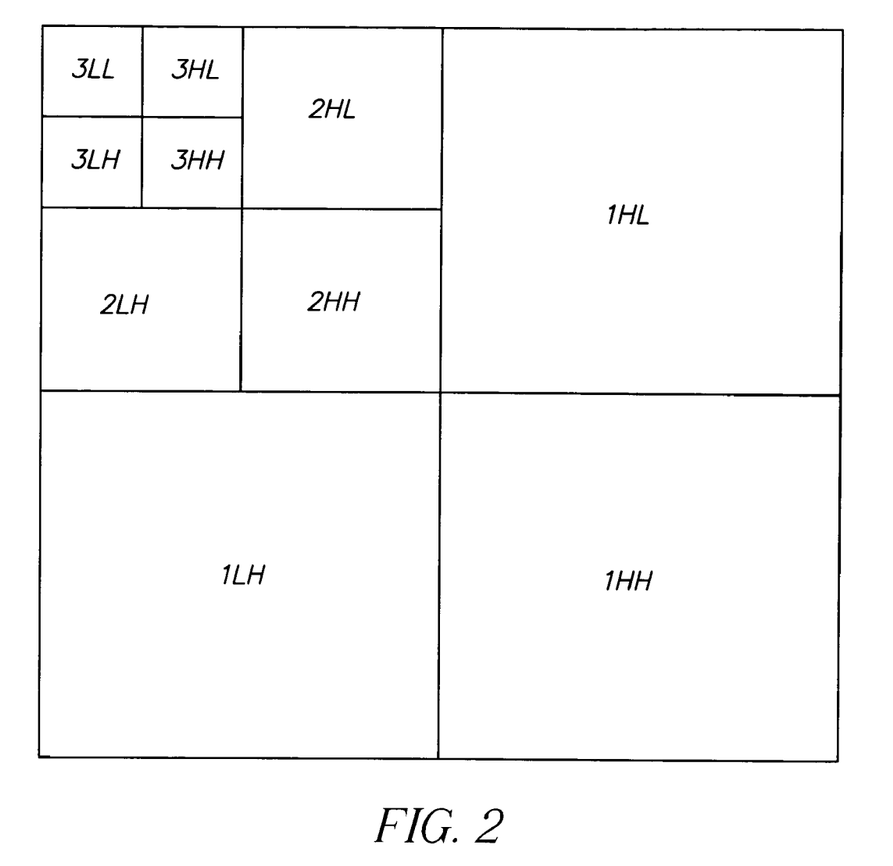
FIG. 2 shows a 3-level 2-D DWT.

JPEG2000 uses a two-dimensional (2-D) discrete wavelet transform (DWT) to transform the input image into a collection of subbands. FIG. 2 shows a 3-level, 2-D DWT and the corresponding labeling for each subband. For example, the subband label kHL indicates that a horizontal high-pass (H) filter has been applied to the rows, followed by a vertical low-pass (L) filter applied to the columns during the $k^{th}$ level of the DWT decomposition. As a convention, the subband 0LL refers to the original image (or image tile).

The DWT decomposition provides a natural multi-resolution representation. The lowest resolution at which the image can be reconstructed is referred to as resolution zero. For example, referring to FIG. 2, the 3LL subband would correspond to resolution zero for a 3-level decomposition. For a $N_L$-level DWT decomposition, the image can be reconstructed at $N_L+1$ resolutions. In general, to reconstruct an image at resolution r (r>0), subbands $(N_L-r+1)$HL, $(N_L-r+1)$LH and $(N_L-r+1)$HH need to be combined with the image at resolution (r−1). These subbands are referred to as belonging to resolution r. Resolution zero consists of only the $N_L$LL band. If the subbands are encoded independently, the image can be reconstructed at any resolution level by simply decoding those portions of the codestream that contain the subbands corresponding to that resolution and all the lower resolutions. For example, referring to FIG. 2, the image can be reconstructed at resolution 2 by combining the resolution 1 image and the three subbands labeled 2HL, 2LH, and 2HH.

Figure 3:
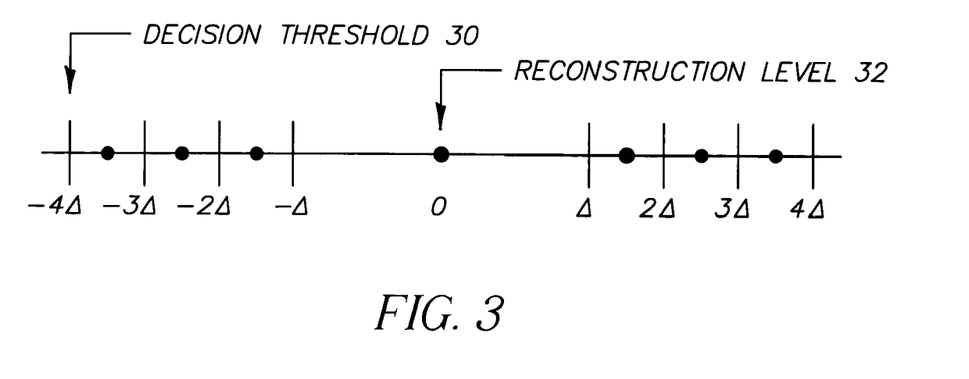
FIG. 3 shows a uniform dead-zone quantizer with a step-size of Δ.

Each wavelet coefficient is quantized with the uniform dead-zone scalar quantizer (16) to produce a sign-magnitude representation of the indices of quantized coefficients. The decision thresholds (30) and reconstruction levels (32) for this quantizer are shown in FIG. 3, for a quantizer step-size of Δ. The JPEG2000 standard mandates the use of a single quantizer step-size for all the coefficients in a given subband. But the step-size can vary from subband to subband. Let the step-size for subband b be $\Delta_b$. The dead-zone refers to the quantizer bin centered around zero, which is bigger than other quantizer bins. Part 1 of the JPEG2000 standard has adopted a dead-zone equal to twice the step-size due to its optimal embedded structure. Briefly, this means that if a $M_b$-bit quantizer index resulting from a step-size of $\Delta_b$ is transmitted progressively starting with the most significant bit (MSB) and proceeding to the least significant bit (LSB), the resulting index after decoding only $N_b$ bits is identical to that obtained by using a similar quantizer with a step-size of $\Delta_b 2^{M_b-N_b}$. This property allows for signal-to-noise ratio (SNR) scalability, which in its optimal sense means that the decoder can cease decoding at any truncation point in the codestream and still produce exactly the same image that would have been encoded at the bit-rate corresponding to the truncated codestream.

The quantized subband coefficients are partitioned into codeblocks. A codeblock can be considered to be tiling of wavelet coefficients. Quantized wavelet coefficients from each codeblock are independently encoded by the entropy coder (18). In JPEG2000, the MQ arithmetic coder is used as the entropy coder. The entropy coder encodes the sign-magnitude representation of the codeblock coefficients as bit-planes. Suppose that the codeblock being processed is from subband b. Then, the samples from the codeblock are quantized with a uniform dead-zone scalar quantizer with step-size $\Delta_b$ as described above. Suppose that the magnitude of the indices of quantized coefficients in subband b is represented by a fixed precision of $M_b$ bits. Let the bits be indexed as 1,2, . . . , $M_b$, where index 1 corresponds to the most significant bit (MSB) and $M_b$ corresponds to the least significant bit (LSB). The $k^{th}$ bit-plane for the codeblock consists of the $k^{th}$ bit from the magnitude representation of all the indices of quantized coefficients from that codeblock. For the purpose of entropy coding, a bit-plane for a codeblock is said to be significant if any of the previous bit-planes were significant or the bit-plane has at least one non-zero bit. If initially a number of codeblock bit-planes are insignificant, this information is signaled separately. Without loss of generality, let us assume that the most significant bit-plane has at least one non-zero bit. The MQ coder encodes the most significant bit-plane of a codeblock using a single coding pass, known as the cleanup pass. The remaining bit-planes are MQ encoded using 3 coding passes, namely, significance pass, refinement pass, and cleanup pass. If the magnitude representation of quantized codeblock coefficients has $M_b$ significant bit-planes, the total number of coding passes necessary to encode all the bit-planes is $(3*(M_b-1)+1)$.

JPEG2000 offers significant flexibility in the organization of the compressed bit-stream. This flexibility is achieved partly through the various structures of components, tiles, subbands, resolution levels, and codeblocks. These structures partition the image data into: 1) color channels (through components); 2) spatial regions (through tiles); 3) frequency regions (through subbands and resolution levels), and 4) space-frequency regions (through codeblocks). JPEG2000 also provides an intermediate space-frequency structure known as a precinct. A precinct is a collection of spatially contiguous codeblocks from all subbands at a particular resolution level.

Figure 4:
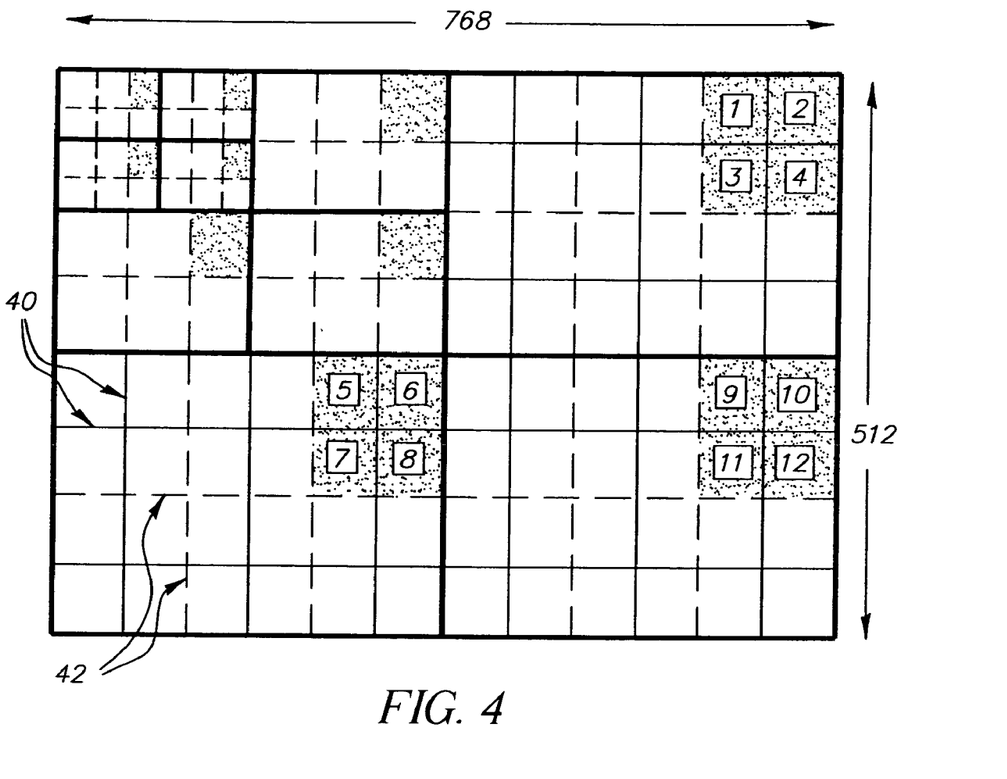
FIG. 4 shows a precinct partition for a 3-level decomposition of a 768×512 image.

In addition to these structures, JPEG2000 organizes the compressed data from the codeblocks into units known as packets and layers. For each precinct, the compressed data for the codeblocks in the precinct is first organized into one or more packets. A packet is simply a continuous segment in the compressed codestream that consists of a number of bit-plane coding passes for each codeblock in the precinct. The number of coding passes can vary from codeblock to codeblock (including zero coding passes). Packets from precincts at all resolution levels in a tile are then combined to form layers. FIG. 4 shows the precinct partition for a 3-level decomposition of a 768×512 image, where codeblock boundaries (40) identify the code blocks and precinct boundaries (42) identify the precincts. The highlighted precincts in resolutions 0–3 correspond roughly to the same 256×256 region in the original image.

The compressed bit-stream for each codeblock is distributed across one or more layers in the compressed bit-stream. All of the codeblocks from all subbands and components of a tile contribute compressed data to each layer. For each codeblock, a number of consecutive coding passes (including zero) is included in a layer. Each layer represents a quality increment. The number of coding passes included in a specific layer can vary from one codeblock to another, and is typically determined by the encoder as a result of post-compression rate-distortion optimization as explained later on.

The compressed data belonging to a specific tile, component, resolution, layer and precinct is aggregated into a packet. The compressed data in a packet needs to be contiguous in the codestream. If a precinct contains data from more than one subband, it appears in the order HL, LH and HH. Within each subband, the contributions from codeblocks appear in the raster order. FIG. 4 shows an example of codeblocks belonging to a precinct. The numbering of the codeblocks represents the order in which the coded data from the codeblocks will appear in a packet. Each packet starts with a packet header. The packet header contains information about the number of coding passes for each codeblock in the packet. It also contains the length of the compressed data for each codeblock. The first bit of a packet header indicates whether the packet contains data or is empty. If the packet is non-empty, codeblock inclusion information is signaled for each codeblock in the packet. This information indicates whether any compressed data from a codeblock is included in the packet. If codeblock data is being included for the first time, the number of most significant bit-planes that are entirely zero is also signaled. After this, the number of coding passes for the codeblock and the length of the corresponding compressed data are signaled. The arithmetic encoding of the bit-planes is referred to as tier-1 coding, whereas the packetization of the compressed data and encoding of the packet header information is known as tier-2 coding.

The general organization of a JPEG2000 bit-stream is as follows. The JPEG2000 bit-stream consists of a main header followed by a sequence of tile-streams. The main header consists of global information necessary for decompression of the entire bit-stream, such as, the image size, tile size, information about the number of components, decomposition levels, layers, quantizer step-sizes, etc. Each tile-stream contains a tile header and packets belonging to that tile. As described above, each packet consists of packet header and compressed codeblock data.

Rate-control refers to the process of generating an optimal image for a target file size (bit-rate). The criterion for optimality can be based on mean squared error (MSE) between the original and the reconstructed image, visual distortion, or any other metric. The embedded block coding scheme of the JPEG2000 and its flexible codestream syntax allow for the generation of a rate-distortion (R-D) optimized codestream for a given file size. Taubman (David Taubman, "High performance scalable compression with EBCOT," *IEEE Transactions on Image Processing*, 9(7), pp. 1158–1170, July 2000) proposed an efficient rate-control method for the EBCOT compression algorithm that achieves a desired rate in a single iteration with minimum distortion. This method can also be used by a JPEG2000 encoder, with several possible variations.

In the basic approach, each subband is first quantized using a very fine step-size, and the bit-planes of the resulting codeblocks are entropy coded. This typically generates more coding passes for each codeblock than will be eventually included in the final bit-stream. If the quantizer step-size is chosen to be small enough, the R-D performance of the algorithm is independent of the initial choice of the step-size. Next, a Lagrangian R-D optimization is performed to determine the number of coding passes from each codeblock that should be included in the final compressed bit-stream to achieve the desired bit-rate. If more than a single layer is desired, this process can be repeated at the end of each layer to determine the additional number of coding passes from each codeblock that need to be included in the next layer.

The Lagrangian R-D optimization works in the following manner. The compressed bit-stream from each codeblock contains a large number of potential truncation points that can occur at the end of each coding pass. The wavelet coefficients contained in a codeblock of subband b are initially quantized with a step-size of $\Delta_b$, resulting in an $M_b$-bit quantizer index for each coefficient. If the codeblock bit-stream is truncated so that only $N_b$ bits are decoded for a particular wavelet coefficient, the effective quantizer step-size for the coefficients is $\Delta_b 2^{M_b-N_b}$. The inclusion of each additional bit-plane in the compressed bit-stream will decrease the effective quantizer step-size by a factor of two. For each codeblock and for each additional coding pass, the increase in bit-rate and the reduction in distortion resulting from the inclusion of that coding pass in the bit-stream are calculated and stored in a table known as the operational rate-distortion table. The distortion measure selected is usually MSE or visually weighted MSE, although any general distortion measure that is additive across codeblocks can be used. Let the total number of codeblocks for the entire image be P, and let the codeblocks in the image be denoted by $B_i$, $1 \leq i < P$. For a given truncation point t in codeblock $B_i$, the associated weighted MSE distortion $D_i^t$ is given by:

$$D_i^t = \alpha_b^2 \sum_{u,v} w_i[u,v](x_i[u,v] - x_i^t[u,v])^2, \quad (1)$$

where u and v represent the coefficient row and column indices within the codeblock $B_i$; $x_i[u,v]$ is the original wavelet coefficient value; $x_i^t[u,v]$ is the quantized coefficient value for truncation point t; $w_i[u,v]$ is a weighting factor for coefficient $x_i[u,v]$; and $\alpha_b$ is the $L_2$-norm of the synthesis basis functions corresponding to subband b. Under certain assumptions about the quantization noise, this distortion is additive across codeblocks. At a given truncation point t, the size of the associated compressed bit-stream (i.e., the rate) for the codeblock $B_i$ is determined and denoted by $R_i^t$.

Given a total bit budget of R bytes for the compressed bit-stream, the EBCOT rate-control algorithm finds the truncation point for each codeblock that minimizes the total distortion D. This is equivalent to finding the optimal bit allocation for all of the codeblocks, $R_i^*$, $1 \leq i \leq P$, such that:

$$D = \sum_i D_i^t \text{ is minimized subject to } \sum_i R_i^t \leq R. \quad (2)$$

In the JPEG2000 literature, this rate-control algorithm is also referred to as post-compression R-D optimization. If the weighting factor $w_i[u,v]$ is set to unity for all subband coefficients, the distortion metric reduces to the mean-squared error.

Our objective is to transcode an existing JPEG2000 image to another JPEG2000 image at a lower bit-rate and/or resolution. As discussed previously, in order to perform optimal rate-control, knowledge of the operational rate-distortion table for each codeblock is necessary. But the distortion information is lost forever because we no longer have access to the original image. The rate information is available, but it is necessary to decode the packets and perform MQ decoding of the compressed codeblock coding passes. Our invention overcomes these problems. Reference will now be made in detail to the presently preferred embodiment of the invention, an example of which is illustrated in the accompanying drawings. As mentioned above, the present invention provides a method for transcoding a JPEG2000 compressed image to a lower bit-rate or lower resolution or both. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 5:
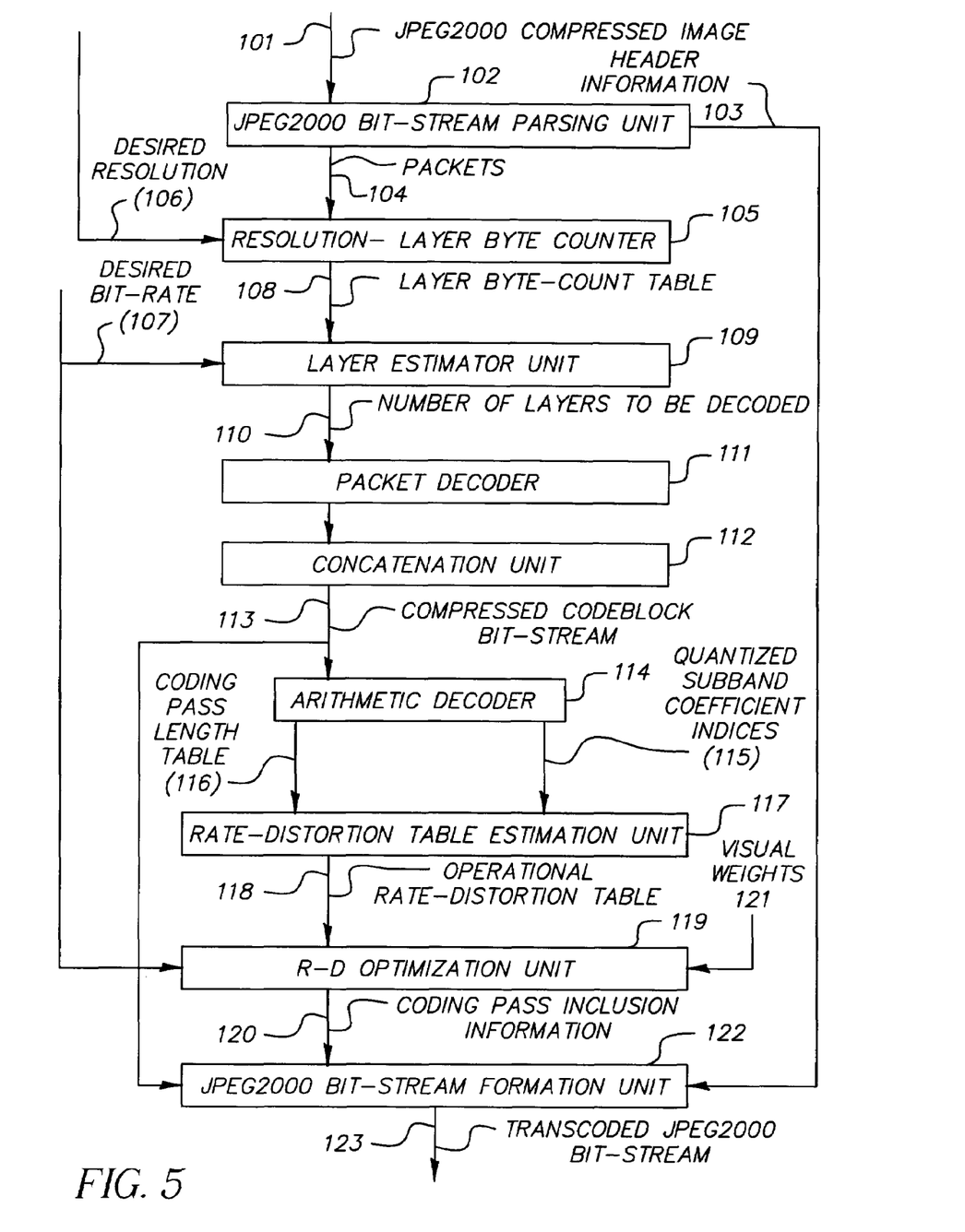
FIG. 5 shows a flow chart of a transcoder according to the present invention.
Figure 6:
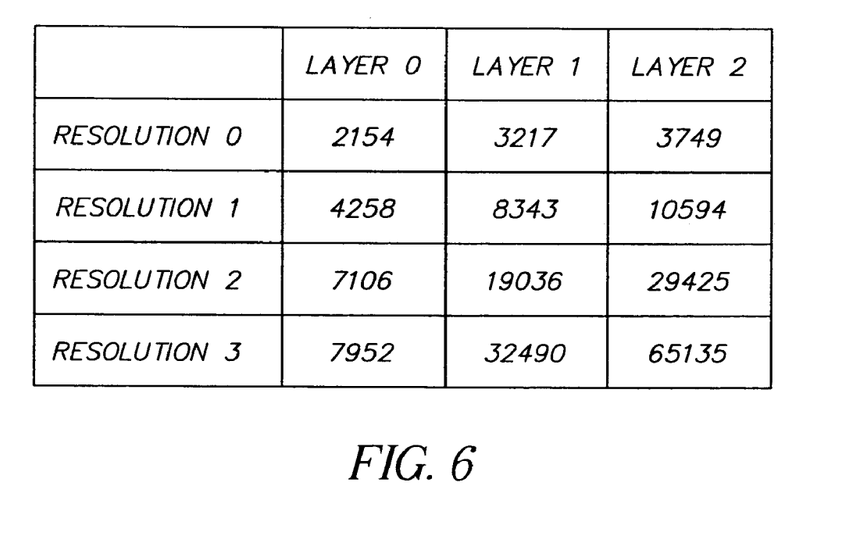
FIG. 6 shows an illustrative example of layer byte-count table.

A flow chart of an image transcoder according to the present invention is shown in FIG. 5. A JPEG2000 compressed image (101) is parsed by a JPEG2000 bit-stream parsing unit (102). The JPEG2000 bit-stream parsing unit (102) extracts header information (103) contained in various JPEG2000 marker segments and separates packets (104) corresponding to different resolutions. A resolution-layer byte counter (105) produces a layer byte-count table (108) for a user-specified desired resolution (106). Consider that the JPEG2000 compressed image consists of L layers denoted by 0, 1, . . . , L-1 and that the user-specified resolution is u. Then, the layer byte-count table (108) entry corresponding to layer x signifies the cumulative size of packets belonging to layers 0, 1, . . . , x and resolutions 0, 1, . . . , u. A user-specified desired bit-rate (107) for the transcoded image is input to a layer estimation unit (109). In a preferred embodiment, the desired bit-rate is specified in terms of the size of the transcoded image in bytes. The layer estimation unit (109) determines the number of layers that need to be decoded (110) up to the user-specified desired resolution to achieve the desired bit-rate (107) by using the layer byte-count table (108). FIG. 6 shows an illustrative example of a layer byte-count table for each resolution of a JPEG2000 compressed image having 4 resolutions and 3 layers. Thus, if the user-specified desired resolution is 2 and the user-specified desired bit-rate is 16384 bytes, layers 0 and 1 would need to be decoded up to resolution 2.

Referring back to FIG. 5, a packet decoder (111) decodes the packets corresponding to the layers that are to be decoded as determined by the layer estimation unit, up to the user-specified desired resolution. The packet decoder also extracts the compressed codeblock bit-stream corresponding to each codeblock that contributed to the packet. A concatenation unit (112) concatenates the compressed data for each codeblock to produce a compressed codeblock bit-stream (113) for each codeblock. An arithmetic decoder (114) performs arithmetic decoding on each compressed codeblock bit-stream (113) to produce quantized subband coefficient indices (115) and a coding pass length table (116). A rate-distortion table estimation unit (117) produces an operational rate-distortion table (118) from the quantized coefficient indices (115) and the coding pass length table (116), which contains an estimate of the length of the compressed data corresponding to each decoded coding pass. An R-D optimization unit (119) performs post-compression R-D optimization to produce coding pass inclusion information (120), which represents the coding passes that should be included in the transcoded bit-stream, using the operational rate-distortion table (118), the desired bit-rate (107) and user-specified visual weights (121). The post-compression R-D optimization is the same as that performed by a JPEG2000 encoder as described earlier. The user-specified visual weights (121) provide the values for $w_r[u,v]$ in Equation (1) while performing post-compression R-D optimization. A JPEG2000 bit-stream formation unit (122) uses the coding passes inclusion information (120), the compressed codeblock bit-streams (113) and header information (103) to produce a transcoded JPEG2000 bit-stream (123).

The arithmetic decoder unit (114) produces quantized subband coefficient indices (115). It is not necessary to explicitly reconstruct the subband coefficient, and perform inverse DWT for the purpose of determining the operational rate-distortion table (118). This is because the transcoding process uses the same basic quantizer step-sizes for quantization. Thus, consider a wavelet coefficient for which the quantizer index is 23 ($10111$ in binary representation), the step-size is $\Delta_b$ and 3 LSBs have been discarded. In that case, for midpoint reconstruction, the reconstructed coefficient is $23.5 \times 8 \, \Delta_b$. Mixing binary and decimal notation, this can be written as $(10111100_b) \, \Delta_b$. It is not necessary to perform inverse DWT as the filters used in Part I of the JPEG2000 standard are Perfect Reconstruction. This implies that if we perform inverse DWT followed by DWT with unlimited precision, we would get exactly the same coefficient back. When the reconstructed coefficient is quantized again with a step-size of $\Delta_b$, the resultant quantizer index in the binary representation is $10111100_b$. Hence, it is adequate to estimate the operational rate-distortion table (118) for the re-encoded codeblock data directly from the quantized coefficient indices (115) after appending a 1 to the binary representation after the least significant bit that was decoded, for each quantized coefficient.

Those skilled in the art will realize that if multiple layers are desired in the transcoded bit-stream, the R-D optimization step (119) can be performed multiple times, once for each desired layer bit-rate.

Figure 7:
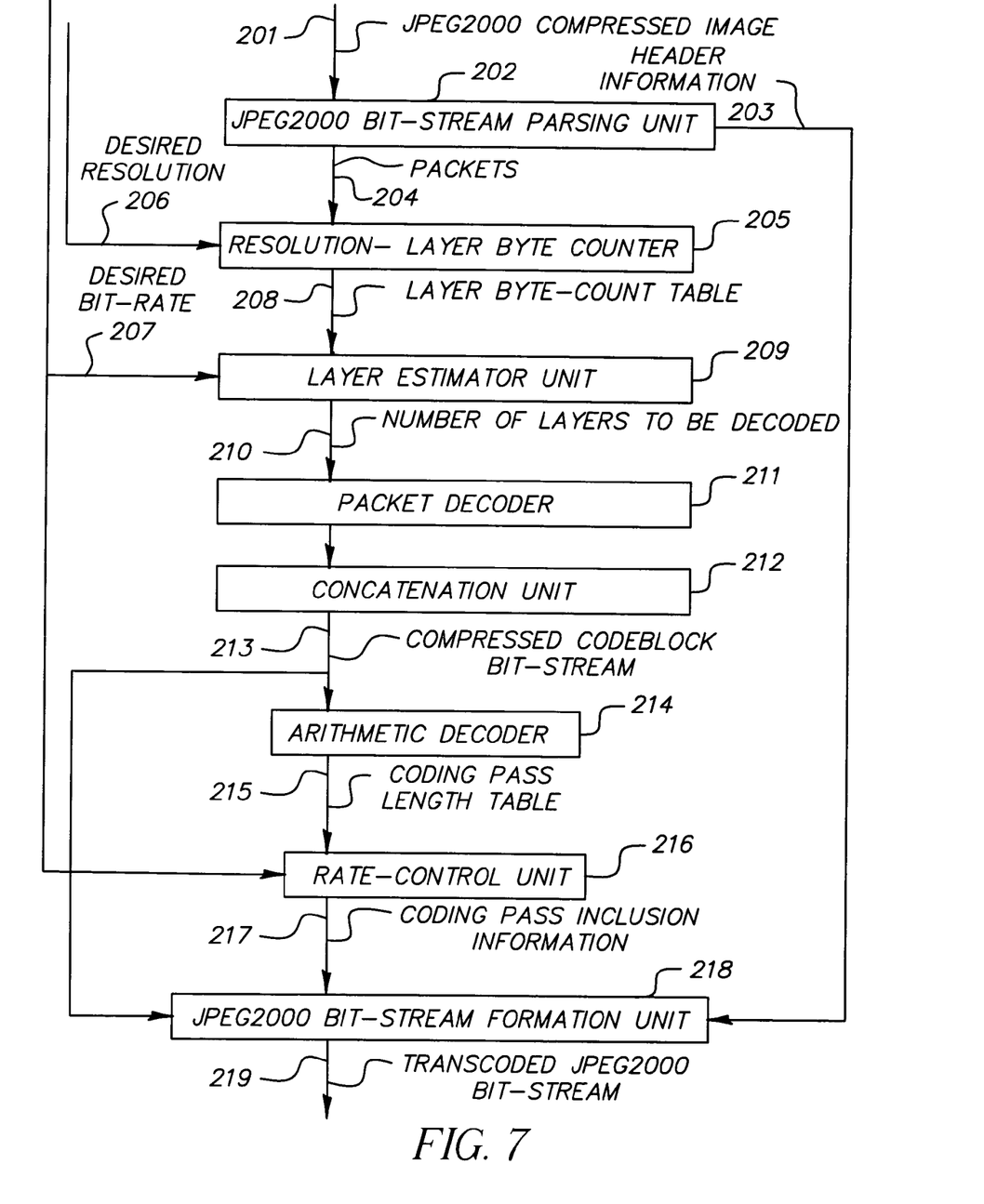
FIG. 7 shows an alternative embodiment of the present invention.

The above transcoding method works very well when the end-user knows the proper visual weights that should be applied at the time of transcoding or when no visual weights are to be used. But sometimes it may be desirable to preserve the relative visual importance of the different codeblocks as determined by the JPEG2000 encoder. As an example, consider two codeblocks that belong to the same subband. As per JPEG2000 standard specification, they both have to be quantized with the same quantizer step-size. But if the encoder decides that the first codeblock is visually more important, it may include more coding passes from the first codeblock in layer 0. As an illustrative example, a JPEG2000 encoder may include 12 coding passes from the first codeblock but only 4 coding passes from the second codeblock in layer 0. This implies that the JPEG2000 encoder assigned a higher visual weight to the first codeblock. But this visual weight can not be recovered by the transcoder. The transcoder has access only to the quantizer step-sizes, whereas in this case, the visual weights manifest themselves only as the differing number of coding passes that get included in layer 0. It may be desirable to mimic the visual weighting used by the JPEG2000 encoder when the image is transcoded to a lower rate. FIG. 7 shows another embodiment of the invention that achieves this goal.

A JPEG2000 compressed image (201) is parsed by a JPEG2000 bit-stream parsing unit (202). The JPEG2000 bit-stream parsing unit (202) extracts header information (203) contained in various JPEG2000 marker segments and separates packets (204) corresponding to different resolutions. A resolution-layer byte counter (205) produces a layer byte-count table (208) for a user-specified desired resolution (206). The information contained in the layer byte-count table (208) is the same as that in the layer byte-count table (108) from the preferred embodiment. A user-specified desired bit-rate (207) for the transcoded image is input to a layer estimation unit (209). The layer estimation unit (209) determines the number of layers that need to be decoded (210) up to the user-specified desired resolution to achieve the desired bit-rate (207) by using the layer byte-count table (208). A packet decoder (211) decodes the packets corresponding to the layers that are to be decoded as determined by the layer estimation unit, up to the user-specified desired resolution. The packet decoder also extracts the compressed codeblock bit-stream corresponding to each codeblock that contributed to the packet. A concatenation unit (212) concatenates the compressed data for each codeblock to produce a compressed codeblock bit-stream (213) for each codeblock. An arithmetic decoder (214) performs arithmetic decoding on each compressed codeblock bit-stream (213) to produce a coding pass length table (215). A rate-control unit (216) produces coding pass inclusion information (217) based on the coding pass length table (215) and the desired bit-rate (207). A JPEG2000 bit-stream formation unit (218) uses the coding passes inclusion information (217), the compressed codeblock bit-streams (213) and header information (203) to produce a transcoded JPEG2000 bit-stream (219).

The main difference between this embodiment and the preferred embodiment is that in this embodiment, the decision whether to include a coding pass in the transcoded bit-stream is independent of distortion. Hence no operational rate-distortion table is generated. Instead the following principle is used by the rate-control unit. Let the number of layers to be decoded, as determined by the layer estimator unit (209) be w. Then, layers 0, 1 . . . , (w-2) are included in their entirety in the transcoded bit-stream. No coding passes from layers w or higher are included in the transcoded bit-stream, whereas only some coding passes from layer (w-1) are included in the transcoded bit-stream. Let the number of coding passes for codeblock B that belong to layer (w-1) be denoted by $N_{w-1}^B$. For each codeblock, the rate-control unit tries to equalize the proportion of coding passes from layer (w-1) that are included in the transcoded bit-stream. Now, the rate-control unit (216) will be discussed in greater detail.

Figure 8:
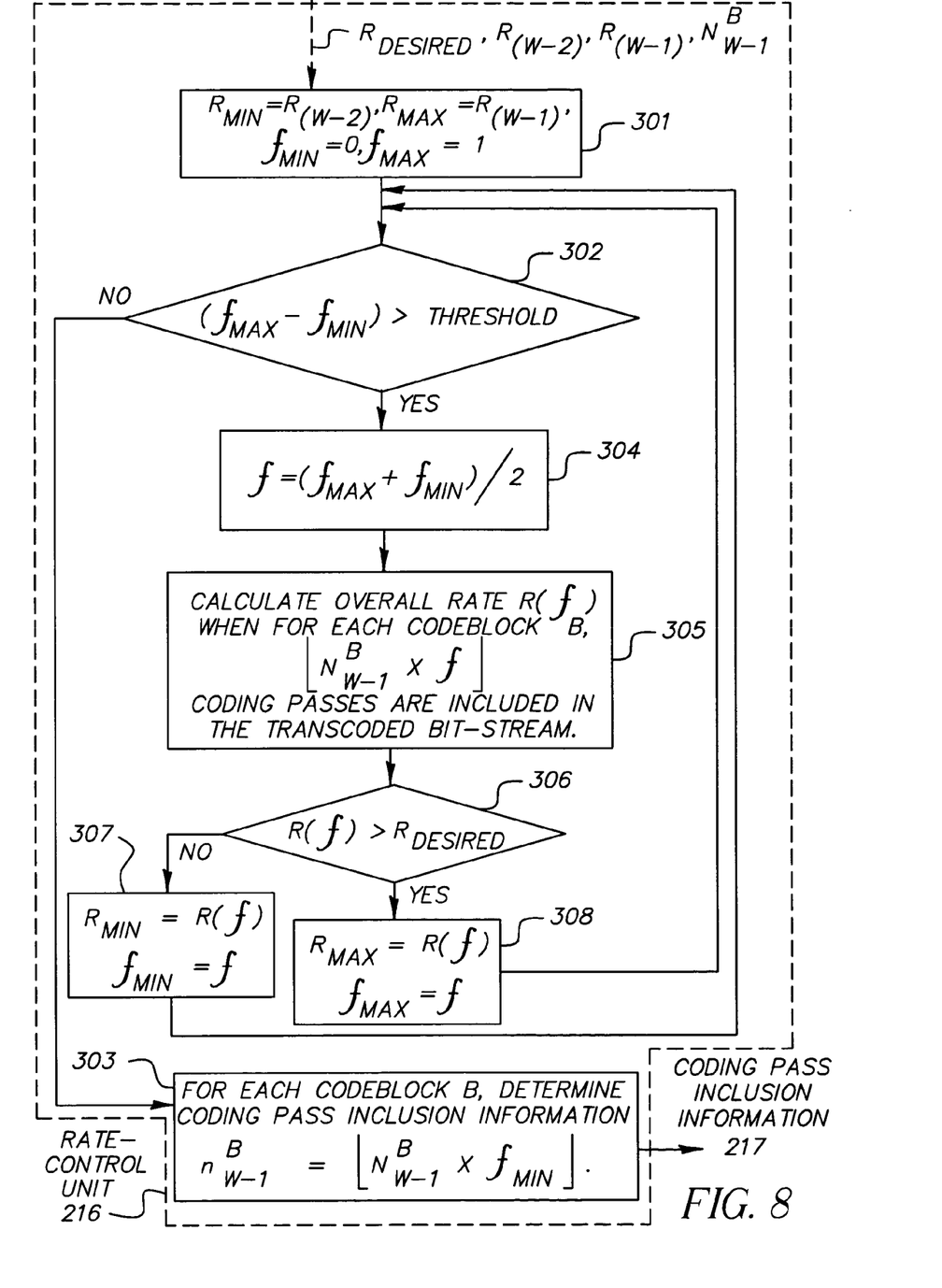
FIG. 8 shows a flow chart of the rate-control unit.

FIG. 8 shows a flow diagram of the rate-control unit (216). Let the overall bit-rates corresponding to layers (w-2) and (w-1) be denoted by $R_{(w-2)}$ and $R_{(w-1)}$, respectively. Also let the desired bit-rate (207) be denoted by $R_{desired}$. In the initialization step (301), $R_{min}$ and $R_{max}$ are set to $R_{(w-2)}$ and $R_{(w-1)}$, respectively. Similarly $f_{min}$ and $f_{max}$ are set to 0 and 1, respectively. Then, in the comparison step (302), ($f_{max}-f_{min}$) is compared against a 'threshold'. If ($f_{max}-f_{min}$) is less than or equal to the threshold, in the coding pass inclusion determination step (303), for each codeblock, the number of coding passes from layer (w-1) to be included in the transcoded bit-stream, $n_{w-1}^B$, is calculated as $\lfloor N_{w-1}^B \times f_{min} \rfloor$. This information is output as the coding pass inclusion information (217). If ($f_{max}-f_{min}$) is greater than threshold, in the update step (304) the value of $f$ is updated to an average of $f_{max}$ and $f_{min}$. The rate determination step (305) determines the overall rate R($f$), if for each codeblock B, $\lfloor N_{w-1}^B \times f \rfloor$ coding passes from layer (w-1) are included in the compressed bit-stream. Then, in another comparison step (306), the overall rate R($f$) is compared with $R_{desired}$. If R($f$) is less than or equal to $R_{desired}$, $R_{min}$ is set to R($f$) and $f_{min}$ is set to $f$ in another update step (307). Otherwise, $R_{max}$ is set to R($f$) and $f_{max}$ is set to $f$ (308), and the flow control returns to step (302). In this embodiment, the threshold in step (302) was chosen to be 0.01, but those skilled in the art will realize that any other small value may be chosen.

Those skilled in the art will realize that the coding pass inclusion information generated in this manner may lead to an overall bit-rate that is less than the user-specified desired bit-rate. In that case, it is possible to start adding one coding pass from each codeblock up to the point where inclusion of another coding pass would result in the desired bit-rate being exceeded. In a preferred embodiment, the codeblock order for inclusion of additional coding passes is from lower resolution to higher resolution. Within a resolution, the precincts are traversed in a raster scan. Within a precinct, the codeblocks are traversed in the order shown in FIG. 4.

Further modification and variation can be made to the disclosed embodiments without departing from the subject and spirit of the invention as defined in the following claims. Such modifications and variations, as included within the scope of these claims, are meant to be considered part of the invention as described.

PARTS LIST

10 JPEG2000 encoder
12 JPEG2000 decoder
14 discrete wavelet transform unit
16 uniform dead-zone quantizer
20 packet formation and bit-stream organization unit
22 bit-stream parser unit
24 entropy decoder
26 dequantization unit
28 inverse discrete wavelet transform unit
30 decision thresholds
32 reconstruction levels
40 code block boundaries
42 code block boundaries
101 JPEG2000 compressed image
102 JPEG2000 bit-stream parsing unit
103 Header information
104 Packets
105 Resolution-layer byte counter
106 Desired resolution
107 Desired bit-rate
108 Layer byte-count table
109 Layer estimator unit
110 Number of layers to be decoded
111 Packet decoder
112 Concatenation unit
113 Compressed codeblock bit-stream
114 Arithmetic decoder
115 Quantized subband coefficient indices
116 Coding pass length table
117 Rate-distortion table estimation unit
118 Operational rate-distortion table
119 R-D optimization unit
120 Coding pass inclusion information
121 Visual weights
122 JPEG2000 bit-stream formation unit
123 Transcoded JPEG2000 bit-stream
201 JPEG2000 compressed image
202 JPEG2000 bit-stream parsing unit
203 Header information
204 Packets
205 Resolution-layer byte counter
206 Desired resolution
207 Desired bit-rate
208 Layer byte-count table
209 Layer estimator unit
210 Number of layers to be decoded
211 Packet decoder
212 Concatenation unit
213 Compressed codeblock bit-stream
214 Arithmetic decoder
215 Coding pass length table
216 Rate-control unit
217 Coding pass inclusion information
218 JPEG2000 bit-stream formation unit
219 Transcoded JPEG2000 bit-stream
301 initialization step
302 comparison step
303 coding pass inclusion determination step
304 update step
305 rate determination step
306 comparison step
307 update step
308 setting step

What is claimed is:

1. A method for transcoding a JPEG2000 compressed image comprised of a collection of sub-bands encoded in one or more coding passes into a compressed bit-stream of quantized sub-band coefficients partitioned into codeblocks of each sub-band and aggregated into layers, said method comprising the steps of:
   (a) parsing a JPEG2000 compressed image to extract header information and packets;
   (b) calculating the number of bytes associated with each layer at a user-specified desired resolution to produce a layer byte-count table;
   (c) estimating the number of layers of the JPEG2000 compressed image that should be decoded up to the user-specified desired resolution for transcoding to a user specified desired bit-rate;
   (d) extracting packets belonging to resolutions up to the user-specified desired resolutions from the layers to be decoded as determined in step (c), and extracting compressed data corresponding to each codeblock that contributed to the packets;
   (e) concatenating the compressed data corresponding to each codeblock, extracted in step (d), to produce a compressed codeblock bit-stream for each codeblock;
   (f) arithmetically decoding the compressed codeblock bit-stream corresponding to each codeblock to produce a quantizer index for each subband coefficient and a coding pass length table, which contains an estimate of the length of the compressed data corresponding to each decoded coding pass;
   (g) producing an operational rate-distortion table for each codeblock from the quantizer indices and the coding pass length table produced in step (f);
   (h) producing coding pass inclusion information, which represents the coding passes that should be included in the transcoded bit-stream, using the operational rate-distortion table produced in step (g), the desired bit-rate and a plurality of user-specified visual weights; and
   (i) producing a transcoded JPEG2000 bit-stream from the compressed codeblock bit-streams produced in step (e), the header information extracted in step (a) and the coding pass inclusion information produced in step (h).

2. A method for transcoding a JPEG2000 compressed image comprised of a collection of sub-bands encoded in one or more coding passes into a compressed bit-stream of quantized sub-band coefficients partitioned into codeblocks of each sub-band and aggregated into layers, said method comprising the steps of:

(a) parsing a JPEG2000 compressed image to extract header information and packets;
(b) calculating the number of bytes associated with each layer at a user-specified desired resolution to produce a layer byte-count table;
(c) estimating the number of layers of the JPEG2000 compressed image that should be decoded up to the user-specified desired resolution for transcoding to a user specified desired bit-rate;
(d) extracting packets belonging to resolutions up to the user-specified desired resolutions from the layers to be decoded as determined in step (c), thereby extracting compressed data corresponding to each codeblock that contributed to the packets;
(e) concatenating the compressed data corresponding to each codeblock, obtained from the packets extracted in step (d), to produce a compressed codeblock bit-stream for each codeblock;
(f) arithmetically decoding the compressed codeblock bit-stream corresponding to each codeblock to produce a coding pass length table, which contains an estimate of the length of the compressed data corresponding to each decoded coding pass;
(g) providing a rate-control function that uses the desired bit-rate from step (c) and the coding pass length tables produced in step (f) to produce coding pass inclusion information, which represents the coding passes that should be included in the transcoded bit-stream, for each codeblock; and
(h) producing a transcoded JPEG2000 bit-stream from the compressed codeblock bit-streams produced in step (e), header information extracted in step (a) and the coding pass inclusion information produced in step (g).

* * * * *

UNITED STATES PATENT AND TRADEMARK OFFICE
CERTIFICATE OF CORRECTION

PATENT NO. : 7,200,277 B2
APPLICATION NO. : 10/611026
DATED : April 3, 2007
INVENTOR(S) : Rajan L. Joshi et al.

It is certified that error appears in the above-identified patent and that said Letters Patent is hereby corrected as shown below:

| | |
|---|---|
| Claim 1, Column 12, Line 43 | In Claim 1, after "each" insert -- said -- |
| Claim 1, Column 12, Line 49 | In Claim 1, delete "pass;" and insert -- passes; -- |
| Claim 1, Column 12, Line 56 | In Claim 1, delete "step (g)," and insert -- step (g) and -- |

Signed and Sealed this

Fourth Day of December, 2007

JON W. DUDAS
*Director of the United States Patent and Trademark Office*